United States Patent [19]

Cohen

[11] Patent Number: 5,603,658
[45] Date of Patent: *Feb. 18, 1997

[54] COMPUTER PLAY TOY FOR INFANTS AND VERY YOUNG CHILDREN

[76] Inventor: Justin R. Cohen, 10010 Walsh Ct., Richmond, Va. 23233

[*] Notice: The term of this patent shall not extend beyond the expiration date of Pat. No. 5,556,339.

[21] Appl. No.: 495,311

[22] Filed: Jun. 27, 1995

[51] Int. Cl.$^6$ ....................................................... A63F 9/24
[52] U.S. Cl. ............................ 463/1; 434/307 R; 446/227
[58] Field of Search ........................ 345/156; 434/85, 434/308, 307 R; 395/152, 154, 927; 273/433–438, 460, DIG. 28, 85 G; 463/7, 1, 31, 37

[56] References Cited

U.S. PATENT DOCUMENTS

| | | | |
|---|---|---|---|
| Re. 34,476 | 12/1993 | Norwood. | |
| 4,522,100 | 6/1985 | Ishii | 84/609 |
| 4,841,291 | 6/1989 | Swix et al. | 434/307 R X |
| 4,887,968 | 12/1989 | Wickstead et al. | 434/85 |
| 5,165,015 | 11/1992 | Coggins | 395/155 |
| 5,169,342 | 12/1992 | Steele et al. | 434/112 |
| 5,265,888 | 11/1993 | Yamamoto et al. | 273/434 |
| 5,296,845 | 3/1994 | Haller | 273/434 X |
| 5,358,259 | 10/1994 | Best | 273/434 |
| 5,420,607 | 5/1995 | Miller et al. | 345/156 |

OTHER PUBLICATIONS

Microsoft Powerpoint Handbook, Microsoft, Corp. 1992 pp. 85, 481–482, 491–492.
Parent's Guide to Children's Software 96, Editors of Newsweek pp. 37, 38, 67, 76, 79, 97, and 176–178.
The MacAuthority, The Cobb Group, Dec. 1993, vol. 2, No. 12.
Computerized 'drawing board', Nov. 26, 1996 Business Week, p. 178.

*Primary Examiner*—Jessica J. Harrison
*Assistant Examiner*—Michael O'Neill

[57] ABSTRACT

The present invention is an educational computer toy for an infant or very young child, in which the computer toy provides audiovisual stimuli simulating an activity (e.g., playing with toys, playing a musical instrument, working with tools, etc.) in response to input by the infant or very young child. The computer toy of the present invention requires the use of a computer (or processor), a display screen, and a keyboard (or input wand or other input device). During play, the user provides an input signal by banging on the keyboard (or shaking the input wand or activating other input devices). The processor in turn, responds to each input signal by presenting on the display screen the next in succession of a group of consecutive sets of audiovisual subsequences whereby an audiovisual simulation of a predetermined activity automatically progresses. According to a computer toy of this type, an infant or very young child can easily interact with a computer accurately simulating various interesting activities.

13 Claims, 6 Drawing Sheets

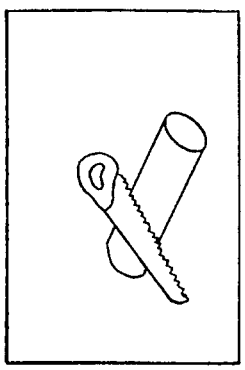
FIG. 5C
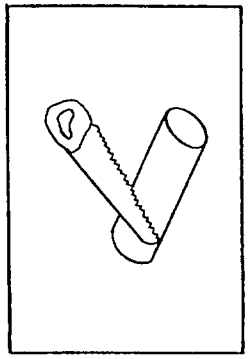
FIG. 5B
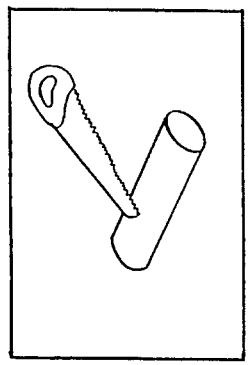
FIG. 5A
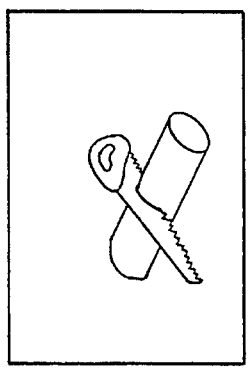
FIG. 5F
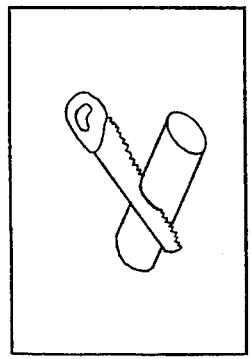
FIG. 5E
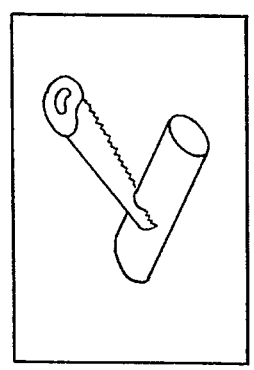
FIG. 5D
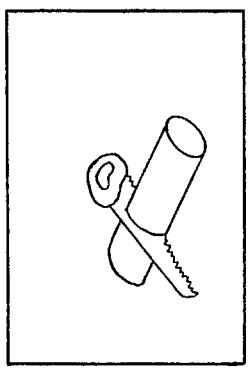
FIG. 5I
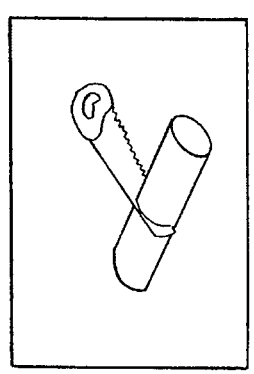
FIG. 5H
FIG. 5G

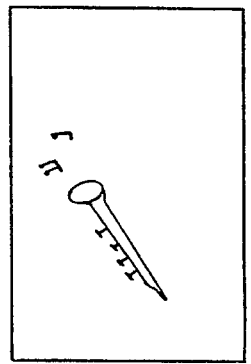
FIG. 6A
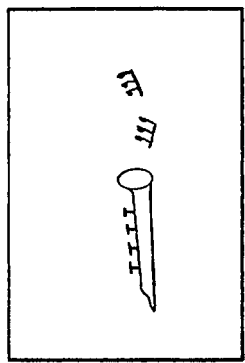
FIG. 6B
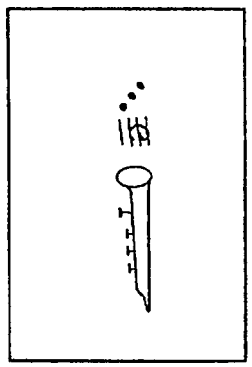
FIG. 6C
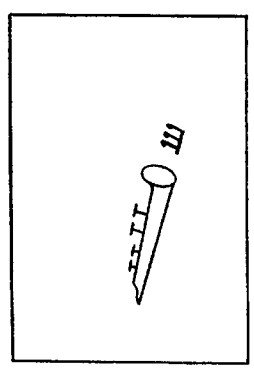
FIG. 6D
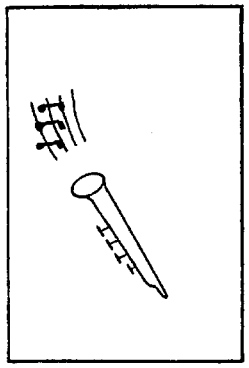
FIG. 6E
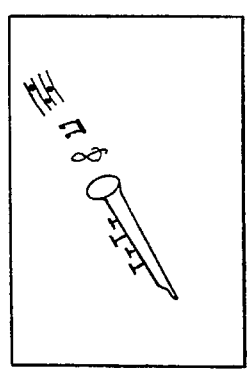
FIG. 6F
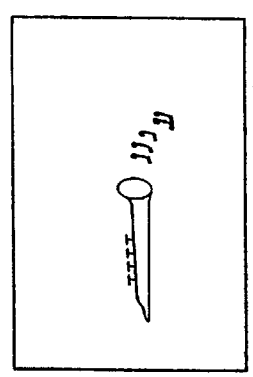
FIG. 6G
FIG. 6H
FIG. 6I

COMPUTER PLAY TOY FOR INFANTS AND VERY YOUNG CHILDREN

BACKGROUND OF THE INVENTION

I. Field of the Invention

This invention relates to video games and toys, and in particular to a unique educational computer toy that allows an infant or very young child to easily control the progression of a simulated activity.

II. Description of Related Art

The ability of infants and very young children to learn through interaction with properly designed toys is widely recognized. The normal toys for this age group have included busy-boxes, musical toys, stuffed animals and the like. Computer toys for infants and very young children, however, are generally not available.

While computer games for older children (i.e. over two years of age) are widely marketed, they are generally not appropriate for infants or very young children. In action-type computer games, for example, the player must perform quick, dexterous actions in response to sudden events occurring on-screen. These events occur at times and in a manner determined by the computer, with the tempo and the character of the events intensifying to the point that a very young child would become overwhelmed. In computer puzzle and word games the player must match wits with the computer or another player to such a degree that the educational background of a very young child would be insufficient.

BRIEF SUMMARY OF THE INVENTION

I. Nature and Substance of the Invention

It is certainly desirable to extend the existing repertory of childrens toys to include computer toys suitable for infants and very young children.

Recently, a few simple interactive computer programs for infants and very young children have been offered for sale in the commercial market. These programs display various shapes and sounds in response to random key strikes made by an infant or small child banging on the keyboard.

While such computer toys initially attract the notice of very young children, they are limited with respect to holding a very young child's attention for an extended length of time. In particular, a very young child will quickly lose interest in these toys because of their abstract nature and the fact that they do not involve the child in a familiar activity relevant to the child. Moreover, their educational value is restricted in that the shapes are randomly placed on the display screen and are not integrated into a recognizable activity.

To overcome these difficulties, the present invention is a computer toy that simulates a complete activity such as playing a musical instrument, washing dishes, working with a wood shop tool, birdwatching, carving a model, folding a paper plane, and other animated activities, while allowing the child to control the progression of the simulated activity. Moreover, because the activity is predetermined in the computer toy of the present invention, the infant or very young child is not required to react with quick dexterous movements nor draw upon complex prelearned mental skills. In fact, he or she need only use those skills necessary to actuate an input device such as banging on a keyboard or shaking a computer wand.

In this fashion, the child is not only encouraged to improve his or her motor skills by actuating an input device, but is also motivated to learn the association between his or her action and the progress of a simulated activity. Furthermore, because this invention totally involves the child as an active participant in a familiar activity, something not possible with current computer toys for infants and very young children, the child is not relegated to a passive role which often leads to frustration and loss of interest.

II. Objects of the Invention

It is an object of the present invention to provide a computer toy with which an infant or a very young child can easily play and interact.

Another object of the present invention is to provide a computer toy that will fascinate and hold the interest of an infant or very young child for an extended length of time.

Another object of the present invention is to provide a computer toy which will encourage an infant or very young child to improve his or her motor skills.

Still a further object of the present invention is to provide a computer toy which will motivate an infant or very young child to recognize the connection between his or her actions and the response of a computer.

In order to achieve the above objects, the present invention can provide various different simulations. Therefore, using the computer toy of the present invention an infant or very young child can simulate playing a melody on a musical instrument, helping out around the house, building a useful item, etc.

Additional objects and advantages of the invention are set forth in the drawings, description, and claims which follow. Some objects and advantages will be obvious from the instrumentalities and combinations particularly pointed out while other objects and advantages may be learned by the practice of the invention.

BRIEF DESCRIPTION OF THE DRAWINGS

A complete understanding of the present invention may be obtained by reference to the accompanying drawings, when taken in conjunction with the detailed description thereof, and in which:

FIGS. 5A through 5I are sequential views of the display screen in various stages of progression of a simulation of the sawing of a log.

FIGS. 6A through 6I are sequential views of the display screen in various stages of progression of a simulation of playing a melody on a flute.

DETAILED DESCRIPTION OF THE INVENTION

The present invention is a computer toy meant to be played with by an infant or young child. This computer toy may require the use of a computer (or processor), a display screen, and an input device or may be self contained with a specially designed processor, screen display, and input device being part of the toy itself. To provide a complete and thorough understanding, this specification sets forth many different but specific embodiments and configurations as illustrative of the present invention with well known systems shown in diagrammatic form. Nevertheless, the present invention may be practiced by application of numerous modifications obvious to those skilled in the art without making use of the specific details shown and described.

Preferably, as a computer implemented process, the computer toy of the present invention will be disposed within a floppy disk, an optical compact disk, or an electronic cartridge. When transferred to the computer being utilized, the present invention allows the processor to simulate on a display screen a predetermined activity, said simulation progressing automatically in response to input signals which are generated and sent to the computer by an input device.

Figure 1:
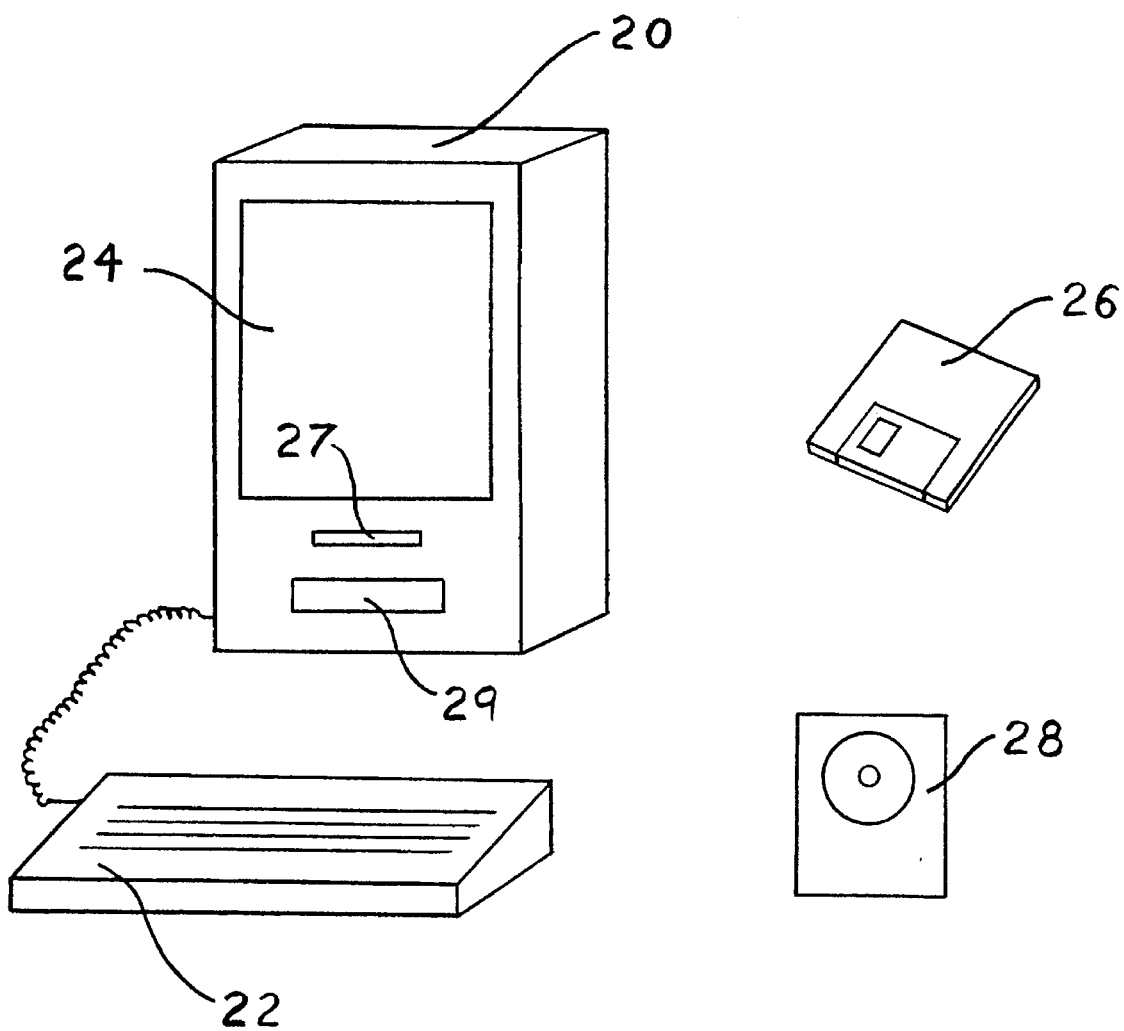
FIG. 1 is a pictorial view of the physical arrangement of the toy of the present invention utilizing a general purpose personal computer.

The computer may be a general purpose personal computer as shown in FIG. 1. Here we see illustrated a physical arrangement in which the present invention utilizes a personal computer 20, a keyboard 22 as an input device, and a display screen 24. The computer implemented process of the present invention is transferred to the personal computer 20 by inserting a floppy disk 26 or optical compact disk 28, within which the computer implemented process is embodied, into the diskette drive 27 or optical compact disk drive 29. The computer toy is then activated by issuing a suitable command to the computer's operating system.

Figure 2:
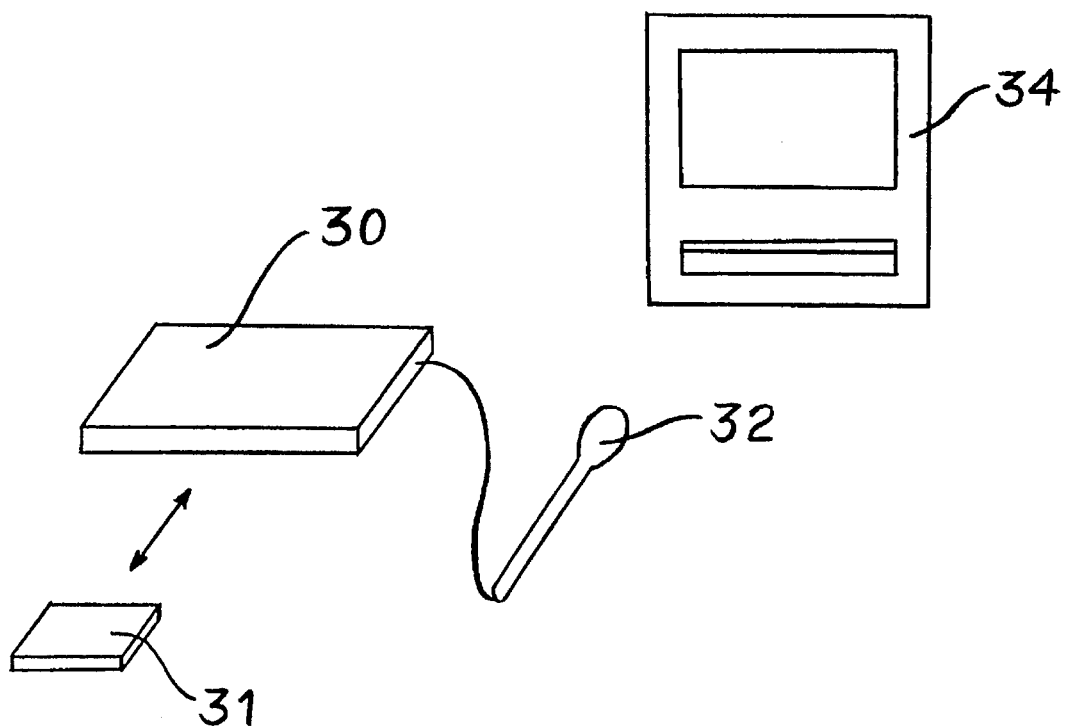
FIG. 2 is a pictorial view of the physical arrangement of the toy of the present invention utilizing a special purpose game system.

Referring now to FIG. 2, there is shown an alternate physical arrangement with the toy of this invention utilizing a special-purpose game system 30 such as the "Nintendo" brand system or the "Sega" brand system, which are designed to operate games and use a standard television set as a display 34. FIG. 2 also illustrates a computer wand 32 and an electronic cartridge 31 (within which this embodiment of the present invention is embodied) both of which are compatible with the special-purpose game system.

The present invention may also be manufactured as a self contained computer toy comprising the computer, input device, and display screen as a single unit.

Figure 3:
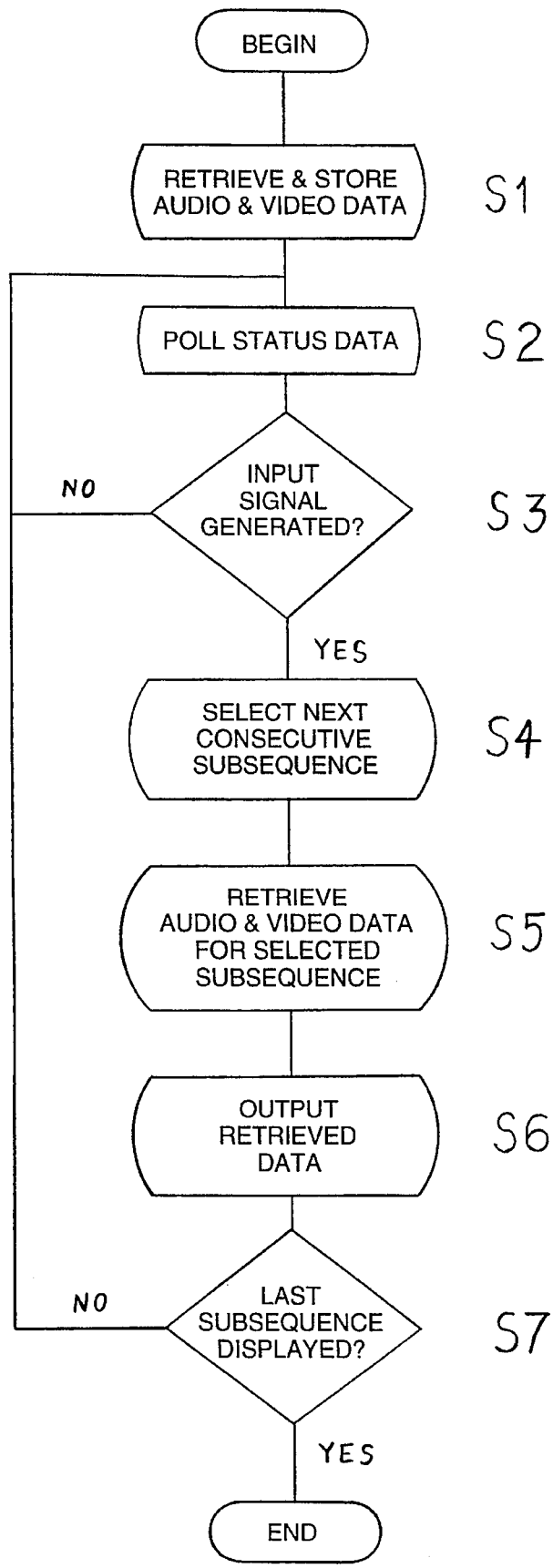
FIG. 3 is a flow diagram of the operation of one embodiment of the present invention.

In all cases, FIG. 3 is a flow chart for explaining a possible order of operations that may be executed by a computer processor to implement the present invention. In this flow chart, the simulation is initiated at step S1 wherein video and audio data are retrieved from a floppy disk, CD ROM, or other storage medium and loaded into RAM (random access memory). The video and audio data correspond to a group of consecutively arranged audiovisual subsequences, each subsequence comprising an ordered collection of individual still pictures and associated sounds appropriate to a particular audiovisual simulation selected by the user. Next, the processor polls the status data of an input device (step S2). In step S3 the processor tests the status data. If an input signal was generated by the input device flow proceeds to step S4, otherwise the flow will return to step S2 and the processor will again poll for an input signal. In step S4 the processor selects the subsequence consecutively following the last subsequence that has been displayed on the screen. After the audiovisual subsequence has been selected, the corresponding video and audio data will be retrieved from RAM (step S5) and outputted to the display screen and audio output (step S6). In step S7 the processor tests if the last audiovisual subsequence has been displayed. If the previously displayed subsequence was not the last subsequence within the stored group of audiovisual subsequences the flow will return to step S2 and the processor will once again poll the status data of the input device.

Figure 4:
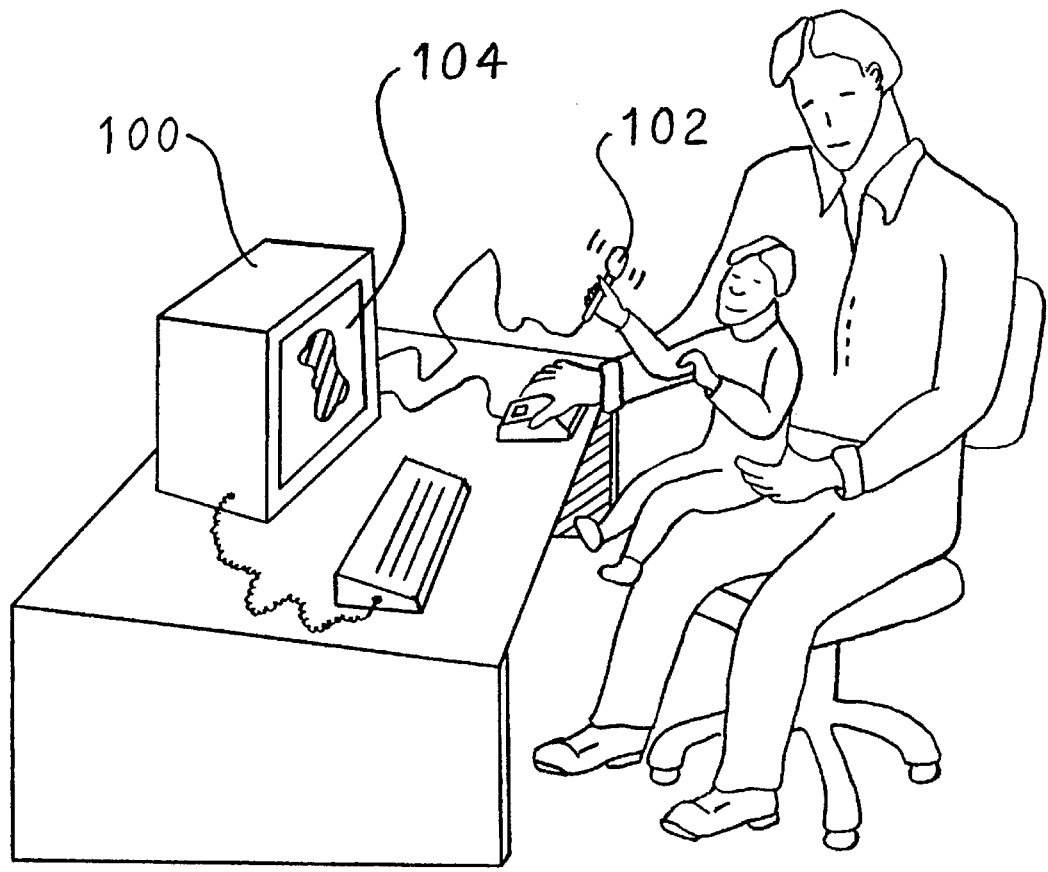
FIG. 4 is a perspective view of a baby, seated in the lap of an adult, using a computer wand input device to control the progression of an audio visual simulation on the display screen of a computer.

Referring now to FIG. 4, we see an infant, seated on the lap of an adult, playing with one embodiment of the computer toy of the present invention. As the infant shakes the input wand 102 the computer 100 consecutively selects and displays individual stored audiovisual subsequences thereby simulating a predetermined pastime, sport, game or other animated activity on the display screen 104. The more vigorously the infant shakes the input wand the faster the audiovisual subsequences are displayed and the faster the simulation progresses. The simulation ends when all of the audiovisual subsequences have been displayed on the screen. A different audiovisual simulation occurs whenever the computer accesses a different group of audiovisual subsequences.

As an example, FIGS. 5A through 5I illustrate the computer simulation of one embodiment of the present invention, namely, that of using a wood working tool. Here we see nine stop action views of the display screen wherein the audiovisual simulation comprises the sawing of a log. In this case, the nine stop action views consist of three separate but consecutive subsequences shown in FIGS. 5A–5C, 5D–5F, and 5G–5I. Specifically, FIGS. 5A–5C show stop action views of the display screen corresponding to a subsequence simulating the start of sawing the log while FIGS. 5D–5F show stop action views of a subsequence halfway through the simulation and FIGS. 5G–5I show stop action views of a subsequence where the log is almost completely sawed through.

Thus, although the entire simulation is predetermined thereby imposing few demands upon the user, its rate of progression is under user control because the computer will only select and display a subsequence in response to the generation of input signals. Hence, an infant or very young child can "saw the log" quickly or slowly depending on how fast he or she bangs on the keyboard, shakes the computer wand, or otherwise actuates an input device.

In another embodiment, shown in FIGS. 6A through 6I, the computer is simulating a melody being played on a flute. As in the previous example, the portion of the simulation illustrated consists of three separate but consecutive subsequences shown here in FIGS. 6A–6C, 6D–6F, and 6G–6I. Each of these subsequences shows various keys of the flute depressed and is accompanied by musical notes. The audio output in this case might be an appropriate melody synchronized with the subsequence visuals and the pace of the melody would therefore be under the control of an infant or very young child playing with this toy.

It is important that the simulation itself be predetermined so that the skill level of an infant or very young child will not be exceeded. Nevertheless, for the toy to be truly interactive there must be some user feedback. This invention accomplishes these conflicting goals by breaking up a predetermined activity into a group of consecutive subsequences that are individually displayed in response to simple input signals. In simulating any particular activity, the computer selects the individual subsequences in consecutive order and displays them whenever an input signal is detected. As the individual subsequences are displayed it appears as if the entire activity is being enacted on the screen. Thus, because the simulation is broken up into a sequence of separate but consecutively ordered subsequences the simulation will progress as each subsequence is displayed. Moreover, the quicker or slower the input device is actuated the quicker or slower the simulation of the activity will progress.

It is evident that numerous different effects and simulations may be created by varying the predetermined group of objects used and the video data corresponding to the placement and display of each object within the group. Furthermore, because the simulation is automatic, (i.e. predetermined by the computer) it is particularly suited to infants and very young children. The user is not required to react to any commands or visuals on the display screen. Complex learned skills do not come into play and facile hand movements are not required. In fact, only those skills necessary to actuate an input device such as banging on a keyboard or shaking a computer wand come into play.

Nevertheless, there is a definite interaction between the user and the computer with appropriate feedback to stimulate and pique an infant or small child's interest. The computer will, for example, select and display an audiovisual subsequence every time an input signal is generated. Thus, the progression of the predetermined simulation is fully controlled by the user. That is, the more quickly the input device is actuated the faster the simulation will progress.

Additionally, the sensitivity of the progression rate may be adjusted to particular users. For example, the computer may select and display a subsequence only every second or only every third time an input signal is generated. In each case, however, the simulation progresses in synchronization with input generated by the user. Thus, where the input device is a computer wand that is actuated by shaking an infant will be able to notice that the simulation only progresses as he or she shakes the wand.

Finally, the simulation may be augmented to include sound to further insure that it will hold the interest of an infant or very young child.

Because of all of these factors, an infant playing with the computer toy of the present invention will maintain interest, learn to associate actuation of the input device with progression of the simulation, and will improve his or her eye hand coordination without the frustration of failure.

The present invention permits an infant or very young child to interact with a computer more easily than has previously been possible by making it feasible for the infant or child to control the progression of an audiovisual simulation. Thus, an improved computer toy has been disclosed.

Regarding the above description, it should be realized that other modifications and changes varied to fit particular operating requirements and environments will be apparent to those skilled in the art. Therefore, the invention is not considered limited to the examples chosen for purposes of disclosure, and covers all changes and modifications which do not constitute departures from the true spirit and scope of this invention. Accordingly, all suitable modifications and equivalents are intended to be encompassed by the present invention, the scope of which is indicated by the appended claims.

Having thus described the invention, what is claimed as being new and desired to be protected by Letters Patent of the United States is as follows:

1. A computer toy for infants and very young children, utilizing a computer with an audio output, a display screen, and an input device, the object of which toy is to allow the user to engage in interactive play with the computer, the computer toy comprising:

(a) a library means for storing video and audio data associated with a group of consecutively arranged audiovisual subsequences, said subsequences comprising sequential portions of an audiovisual simulation of a predetermined animated activity;

(b) a detection means for detecting input signals which are generated and sent to the computer by the input device whenever the input device is activated by the user whereby the user is able to control the pace of said simulation;

(c) a selection means for selecting from the group of consecutively arranged audiovisual subsequences the subsequence which consecutively follows the last selected subsequence;

(d) an audio means for retrieving the audio data associated with a selected audiovisual subsequence and sending said audio data to the computer audio output whereby sound is generated;

(e) a video means for retrieving the video data associated with a selected audiovisual subsequence and sending said video data to the display screen whereby video is generated; and (f) a control means for enabling, whenever an input signal is detected by said detection means, said selection means to select an audiovisual subsequence and said audio and video means to respectively retrieve and output audio and video data corresponding to said selected subsequence, whereby an audiovisual simulation of said predetermined animated activity automatically progresses.

2. A computer toy according to claim 1, wherein the predetermined activity is that of playing a musical instrument.

3. A computer toy according to claim 1, wherein the predetermined activity is that of working with tools.

4. A computer toy according to claim 1, wherein the predetermined activity is that of playing with a kaleidoscope.

5. A computer toy according to claim 1, wherein the predetermined activity is that of paper folding.

6. A computer toy according to claim 1, wherein the predetermined activity is that of performing a household chore.

7. A computer toy to claim 1, wherein said group of consecutively arranged audiovisual sequences which simulates a predetermined activity consists of a single audiovisual sequence.

8. A computer toy according to claim 1, further comprising a floppy disk compatible with the computer to be utilized, wherein said library means, detection means, selection means, audio means, video means, and control means are disposed within the magnetic media of said floppy disk.

9. A computer toy according to claim 1, further comprising an optical compact disk compatible with the computer to be utilized, wherein said library means, detection means, selection means, audio means, video means, and control means are disposed within said optical compact disk.

10. A computer toy according to claim 1, further comprising an electronic cartridge compatible with the computer to be utilized, wherein said library means, detection means, selection means, audio means, video means, and control means are disposed within said electronic cartridge.

11. A computer toy according to claim 1, further comprising the computer, audio output, display screen, and input device, that said computer toy utilizes, whereby said computer toy is self contained.

12. A method of amusing a baby, utilizing a general purpose personal computer with a display screen, said method comprising:

(a) inserting the floppy disk of the computer toy of claim 8 into the diskette drive of the personal computer;

(b) transferring the computer implemented process disposed within the floppy disk of the computer toy of claim 8 to the personal computer;

(c) activating the computer implemented process; and (d) giving the baby access to an input device that may be actuated by simple hand motions, whereby the baby may control the pace of an animated activity that is simulated on the display screen of the personal computer.

13. A method of amusing a baby, utilizing a general purpose personal computer with a display screen, said method comprising:

(a) inserting the optical compact disk of the computer toy of claim 9 into the optical compact disk drive of the personal computer;

(b) transferring the computer implemented process disposed within the optical compact disk of the computer toy of claim 9 to the personal computer;

(c) activating the computer implemented process; and (d) giving the baby access to an input device that may be actuated by simple hand motions, whereby the baby may control the pace of an animated activity that is simulated on the display screen of the personal computer.

* * * * *